(No Model.)
2 Sheets—Sheet 1.

F. B. HERZOG.
COMBINED AUDIBLE STOCK QUOTATION SYSTEM AND FIRE TELEGRAPH.

No. 311,756.
Patented Feb. 3, 1885.

(No Model.) 2 Sheets—Sheet 2.

F. B. HERZOG.
COMBINED AUDIBLE STOCK QUOTATION SYSTEM AND FIRE TELEGRAPH.

No. 311,756. Patented Feb. 3, 1885.

Witnesses
Geo. W. Breck.
Schuyler S. Wheeler.

Inventor
F. Benedict Herzog
By his Attorneys
Curtis & Crocker

UNITED STATES PATENT OFFICE.

F. BENEDICT HERZOG, OF NEW YORK, N. Y.

COMBINED AUDIBLE STOCK-QUOTATION SYSTEM AND FIRE-TELEGRAPH.

SPECIFICATION forming part of Letters Patent No. 311,756, dated February 3, 1885.

Application filed May 26, 1884. (No model.)

*To all whom it may concern:*

Be it known that I, F. BENEDICT HERZOG, a citizen of the United States, residing at New York, in the county and State of New York, have invented a new and useful Audible-Quotation-Indicating System, of which the following is a specification.

The present stock-telegraph system, by which a number of individuals or officers are furnished with petroleum, grain, or other market quotations, involves such a cost of equipment and maintenance as to necessitate the charging of a large rental or subscription to each of its subscribers. It requires a circuit of its own, comprising several wires, a separate and very expensive printing-instrument or "ticker" for each subscriber, and complicated and costly transmitting machinery at the station from which the quotations are sent out, as well as the constant daily attendance of several operators to transmit the signals, and attendants to keep the tickers in working order, supply them with paper, ink, &c., all of which items bring the cost of maintenance up to a high figure. A system, therefore, by which subscribers could be supplied with stock-quotations or the market prices of any commodities, or other information, without involving the use of such costly instruments and daily attendance is a very desirable thing; and it is the object of my invention to produce such a system, and this I do by giving the quotations by means of audible signals easily recognizable by each subscriber, thereby being enabled to use simpler circuits, entirely dispensing with any type printing or recording instruments, and otherwise reducing the expense, so as to be able to furnish the desired information at a trifling rental as compared with the present necessarily high rates.

Figure 1:
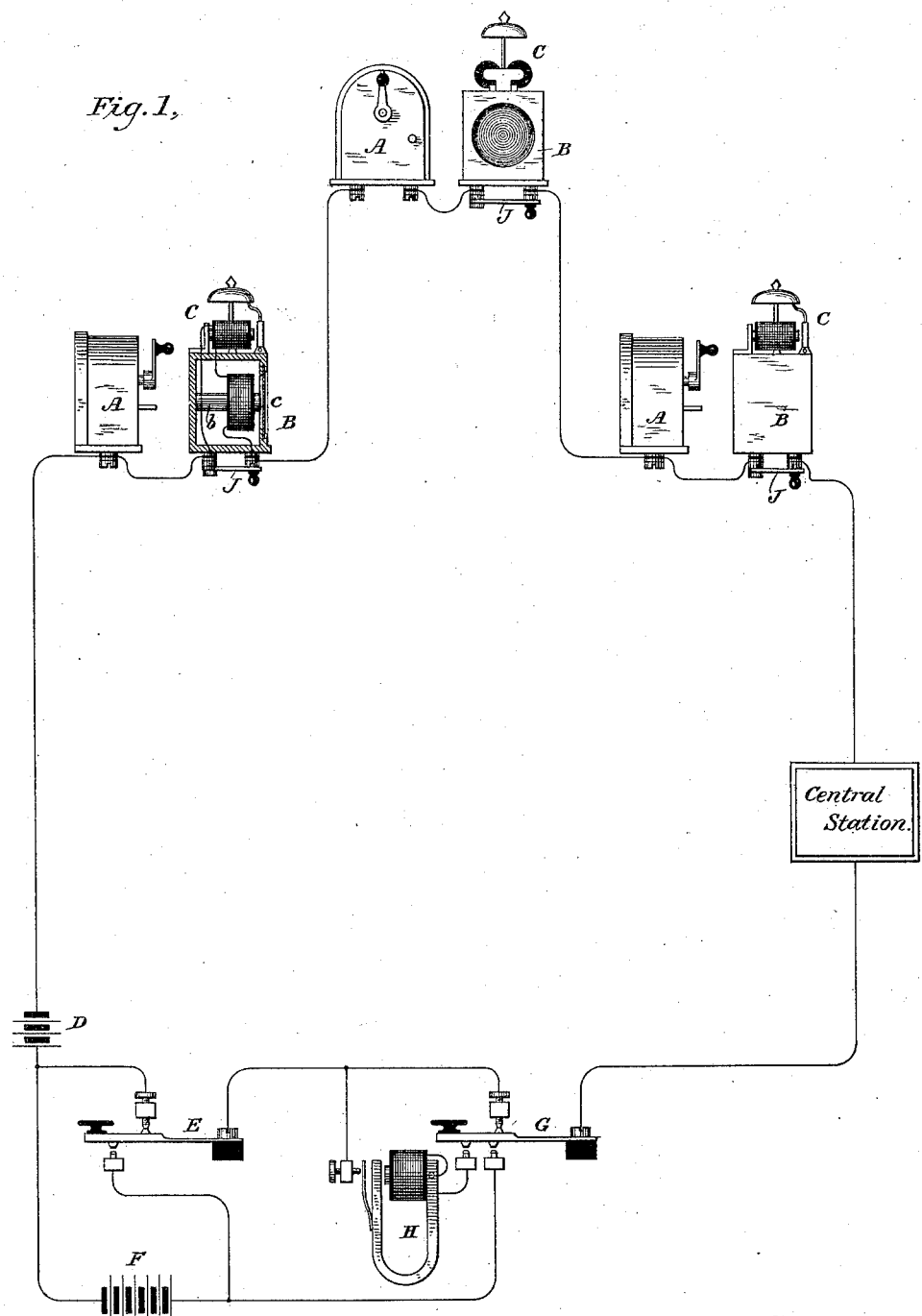
Figure 2:
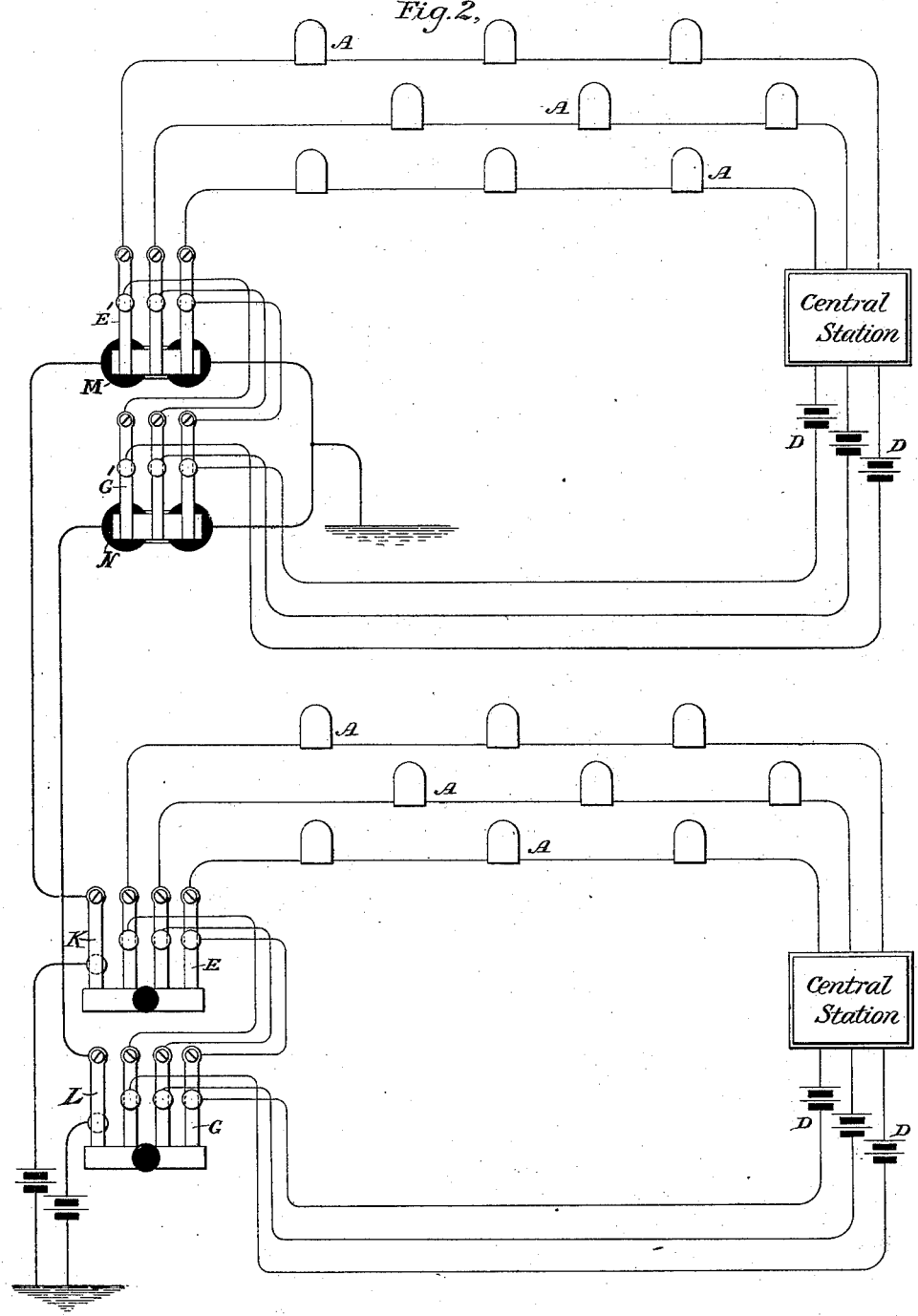

I shall now proceed to explain my invention by reference to the accompanying drawings, Figure 1 representing a circuit comprising a number of subscribers' offices and furnished with the necessary apparatus for giving the quotations according to my invention, and Fig. 2 representing my invention as applied to two independent district-telegraph systems.

In order to avoid the necessity of building new line-circuits for this system, so as to cheapen the service to the utmost extent, I have arranged my invention so as to be capable of being applied to the "district-telegraph" circuits now in common use without in the least interfering with the ordinary operation of these circuits. In this way each subscriber who is already provided with district-telegraph connection only needs to be furnished with a suitable receiving-instrument—such as a telephone or sounder—capable of making audible the quotation-signals transmitted over the district-telegraph circuit by an operator located at some convenient point thereon and supplied by telegraph or otherwise with the necessary information. The indicators may also be supplied to subscribers who do not wish the call-boxes.

A A A represent ordinary district-telegraph instruments placed on the same circuit at the offices of different subscribers and "central station"—the office or headquarters where the signals are received—in the usual manner. At each subscriber's office is placed in circuit a receiving device, B, for rendering audible the signals indicating the quotations, &c. This device, as shown, consis's of a box containing an electro-magnet, $b$, provided with a diaphragm-armature, $c$, forming a telephonic receiver; but an ordinary telegraph-sounder or any suitable sounding-instrument may be employed instead. To this box is also attached a single-stroke electric bell, C, which is also placed in circuit and is arranged to ring on the backstroke of its armature when the circuit is broken in the customary closed-circuit systems.

D represents the regular battery constantly in circuit, which may be placed at the office of the operator who sends out the quotation-signals, as shown in Fig. 1, or at the central station of the district-telegraph system, as is usually the case, and as shown in Fig. 2.

E is a circuit-switching key placed at the quotation-operator's office, by depressing which the extra battery F is cut into the main circuit in order to augment the normal current already in circuit.

G is a second key placed at the same office, by depressing which the extra battery F is likewise cut into circuit, and a shunt around this extra battery is closed through the rheotome H, so that the effect of depressing this key is to introduce the extra battery in circuit, and at the same time a circuit-breaking rheotome which short-circuits the extra battery intermittently, and thereby causes a pulsating current to be sent over the line without breaking the main circuit. This rheotome may be constructed in any well-known manner, and provided with a tuning-fork or reed-armature, as shown, so as to give any desired rate of vibration or tone. This current is heard in the subscribers' receivers as a buzzing or rattling sound, and is instantly distinguishable from the simple impulses or "clicks" transmitted by the key E. Both these keys may be provided with continuity-points arranged in the well-known way, so as to insure the closing of one circuit before breaking the other, in order to avoid even a momentary interruption of the circuit, which would affect the instruments at the central station. It will now be understood that by depressing either of the keys E and G the quotation-operator, who is furnished with the requisite information, can send over the circuit either click or "buzz" signals, as he desires, and that these signals will consist merely of augmentations of the current normally flowing through the circuit, and will therefore not affect the central-station instruments. Suppose it is desired to employ this system for giving petroleum quotations, for example. For this purpose the present custom would require that the quotation should indicate, first, whether the price quoted was that at Oil City or at the subscriber's city—New York, for example; second, the number of barrels sold, and, third, the price paid, which should be given within one-eighth of one cent. Suppose, for example, the quotation to be given should be two hundred and eighty-four barrels sold at Oil City at ninety-eight and one-half cents. The quotation-operator would first depress the key G so as to transmit a buzz-signal, indicating thereby that the price given refers to Oil City. He then, by depressing the key E, transmits two click-signals, then a pause, then eight more, another pause, and then four more, thus indicating the number of barrels. After an interval long enough to distinguish the price from the quantity, which should be at least twice as long as the pauses between the consecutive digits of the quantity-signal, he proceeds to transmit "98½" by depressing the key E nine times, then eight, and then four times, the eighths being understood. If the quotation referred to New York instead of Oil City, the quotation would be preceded by two buzz-signals instead of one, or in this case the buzz-signal might be omitted entirely, thus distinguishing the New York quotations from those at Oil City. When the quotation contains a "0,"—if it be two hundred barrels, for example—the "0" may be indicated by a short buzz-signal transmitted by the key G, very perceptibly shorter than the buzz preceding the quotation, so as to prevent confusion between the two; or, if preferred, the signal signifying "0" may be made to consist of two or more very short buzz-signals immediately following each other.

Instead of petroleum quotations, suppose it is desired to give stock quotations—"Union Pacific 100 at 65⅜," as an example. The quotation-operator would first transmit a conventional signal consisting of a certain combination of buzz-signals prearranged to denote "U. P." Then he would send "100," as in the petroleum quotations given, and then "65.3," by giving six clicks, then five, and then three, the eighths being understood. By combining these two kinds or qualities of signals in different conventional combinations, the desired quotation or other piece of information, whatever it may be, is given by the transmitting-operator.

I have herein shown my invention as applied to district-telegraph circuits such as are now in extensive use in large cities. With such an arrangement it is important that the signals automatically sent to the central station by the subscribers' district call-boxes should not be confounded with those of the quotation service, which are being constantly sent over the same circuit. To accomplish this I provide at each quotation-receiving instrument B an electric bell, C, which operates and rings whenever the circuit is being interrupted by one of the district instruments, and so warns all persons listening at the quotation-receivers that the signal then being sent over the circuit is a subscriber's "call." These warning-bells are connected in circuit, and constructed to strike on the backstroke when the circuit is opened, so that the bell gives one tap for each break produced by the district instrument in unwinding.

It is to be observed that the quotation-signals are not caused by breaks in the circuit, but merely by variations of the strength of the current, and therefore the bells C are not affected by those signals. Consequently, unless the bell is ringing or begins to ring, the listener knows that the signal then audible in the receiver is a quotation. By this arrangement the district-call system and the quotation system do not interfere with each other's operation. Of course these bells may be dispensed with, if preferred.

In order to cut any receiving-instrument out of circuit, so as to render the signals temporarily inaudible when desired, I provide short-circuiting switches J J at each instrument, which may be turned by the subscriber at pleasure.

I shall now explain the manner of operating a number of different district-telegraph circuits, or even a number of independent district-telegraph systems, simultaneously by a single quotation-operator.

Fig. 2 represents two such independent systems, each having three subscribers's call-circuits centering at its central station.

G and E are keys operated by the quotation-operator for sending the two different kinds of signals, as described, these keys performing exactly the same functions and being identical with the corresponding keys of Fig. 1. By the side of each of these keys are placed two other keys, as shown, similarly connected, respectively, with the other two circuits belonging to the same system, and also two circuit-closing keys, K and L, all four keys in each set being mechanically connected by a cross-bar, as shown, so as to be depressed simultaneously. By means of these two sets of keys all the circuits of this system are brought within the quotation-operator's control for working them according to my invention.

To enable the operator to supply the quotations to an independent system, separate "trunk" lines provided with batteries are formed through the keys K and L to a station (which may be the central station) on the other system of circuits, and through two electro-magnets, M and N, respectively, the two ends of each trunk circuit being grounded, as shown. The armature of each of these electro-magnets is carried by a set of keys, F' and G', which serve to transmit click and buzz signals over all the circuits of that system in precisely the same manner as do the keys E and G of the other system. It is evident, then, that the impulses or signals transmitted through the circuits of the first system are repeated in those of the second by means of the repeating-keys E' and G' operated by the electro-magnets, as shown. Any number of systems may thus be connected with the primary transmitting-keys and operated by the same quotation-operator in the manner described.

I have described my invention as applied to district-telegraph circuits of the usual character; but of course it may be employed on circuits built expressly for the purpose; or it may be applied to burglar-alarm or other circuits already constructed for other purposes.

The invention is more particularly adapted to quotations for single products, as wheat, petroleum, &c.; but by making proper combinations of the click and buzz signals and intervals it may be employed for furnishing other quotations or information to its subscribers. It may be employed to supply standard time, for example.

In cases where the changes of market prices do not succeed each other rapidly it may be advantageous to have the last quotation repeated at short intervals, and this may be done either by the quotation-operator by hand, or it may be done by suitable mechanism constructed to transmit the signals automatically at stated intervals, which feature I propose to make the subject of another application for Letters Patent.

I do not confine myself to any particular mechanism for transmitting the characteristic signals over the circuit, nor to any particular form of receiving-instrument for receiving the quotation or other signals. The quotation-operator may of course be located at the central station of the district system, if desired.

I am of course aware that it is old in the art to combine in a circuit with transmitting and receiving apparatus supplemental transmitters and receivers which may be used without interfering with the operation of the first-named apparatus, and to send two or more telegraphic messages simultaneously over the same circuit by transmitting one set of signals composed of simple changes in the current-strength on the line and another set composed of rhythmical pulsations in the current, each set of signals being independently transmitted and received upon a separate instrument constructed to respond to only one set of signals without being affected by the other, such duplex and sextuplex telegraphs being described in Patents to Field, No. 242,411, Edison, No. 217,781, Gray, No. 108,378, &c.; but, as far as I know, no telegraph system has hitherto been constructed in which the messages or information have been transmitted by making these two kinds of signals follow each other in different combinations prearranged to denote the desired facts and receiving them upon the same instrument, which enables the signals to be understood without the use of two or more separately responsive receiving-instruments.

The method of supplying quotations, &c., described in the foregoing specification has been made by me the subject of another application of Letters Patent, Serial No. 152,241, filed January 8, 1885, and is not herein claimed.

What I claim as my invention, and desire to secure by Letters Patent, is—

1. The combination in direct circuit, with transmitting apparatus for transmitting two qualities or kinds of signals—such as single impulses or click signals and vibratory or buzz signals—at will, of receiving-instruments each of which will reproduce and make audible and distinguishable both classes of signals thus transmitted, substantially as hereinbefore set forth.

2. The combination, with a district-telegraph call-circuit, of a transmitting apparatus for transmitting two qualities or kinds of signals—such as single impulses or click signals and vibratory or buzz signals—and a series of receiving-instruments directly in said circuit, each of which will reproduce and make audible and distinguishable both classes of signals thus transmitted, substantially as hereinbefore set forth.

3. The combination of a normally closed and charged district-telegraph call-circuit, a transmitting key or device for transmitting single impulses or clicks, a transmitting key or device for transmitting vibratory or buzz signals, and receiving-instruments directly in said circuit, each adapted to reproduce and make audible both kinds of signals, as and for the purposes hereinbefore set forth.

4. The combination, with a district-telegraph call-circuit substantially as described, of supplemental circuit-controlling transmitting apparatus located thereon for sending electric signals over the circuit, receiving-instruments at distant stations responding to said signals, and additional devices at said receiving-instruments for indicating that a call is being sent over the circuit by one of the district-boxes, substantially as hereinbefore set forth.

5. The combination, with a district-telegraph circuit provided with its call-boxes A A A, and a battery, D, normally in circuit, of the transmitting-key E, arranged to cut the extra battery F into the circuit, the transmitting-key G, for cutting the extra battery into circuit, and also the rheotome or circuit-breaker H, so as to intermittently shunt the extra battery, and receivers B for making audible the signals transmitted by the said keys, substantially as described.

6. The combination of two or more independent circuits containing each in direct circuit signal-transmitting apparatus for transmitting two qualities of signals such as hereinbefore specified, and receiving-instruments, each of which latter instruments is adapted to reproduce and make audible both qualities of signals, the transmitting apparatus of all the circuits being connected together, substantially as hereinbefore described, so that the operation of the transmitting apparatus in one of the circuits shall effect a corresponding operation of the transmitting apparatus in the other circuits, substantially as and for the purposes hereinbefore set forth.

Signed and witnessed this 24th day of May, 1884.

F. BENEDICT HERZOG.

Witnesses:
DAVID WELCH,
CHARLES G. CURTIS.